Patented Mar. 23, 1954

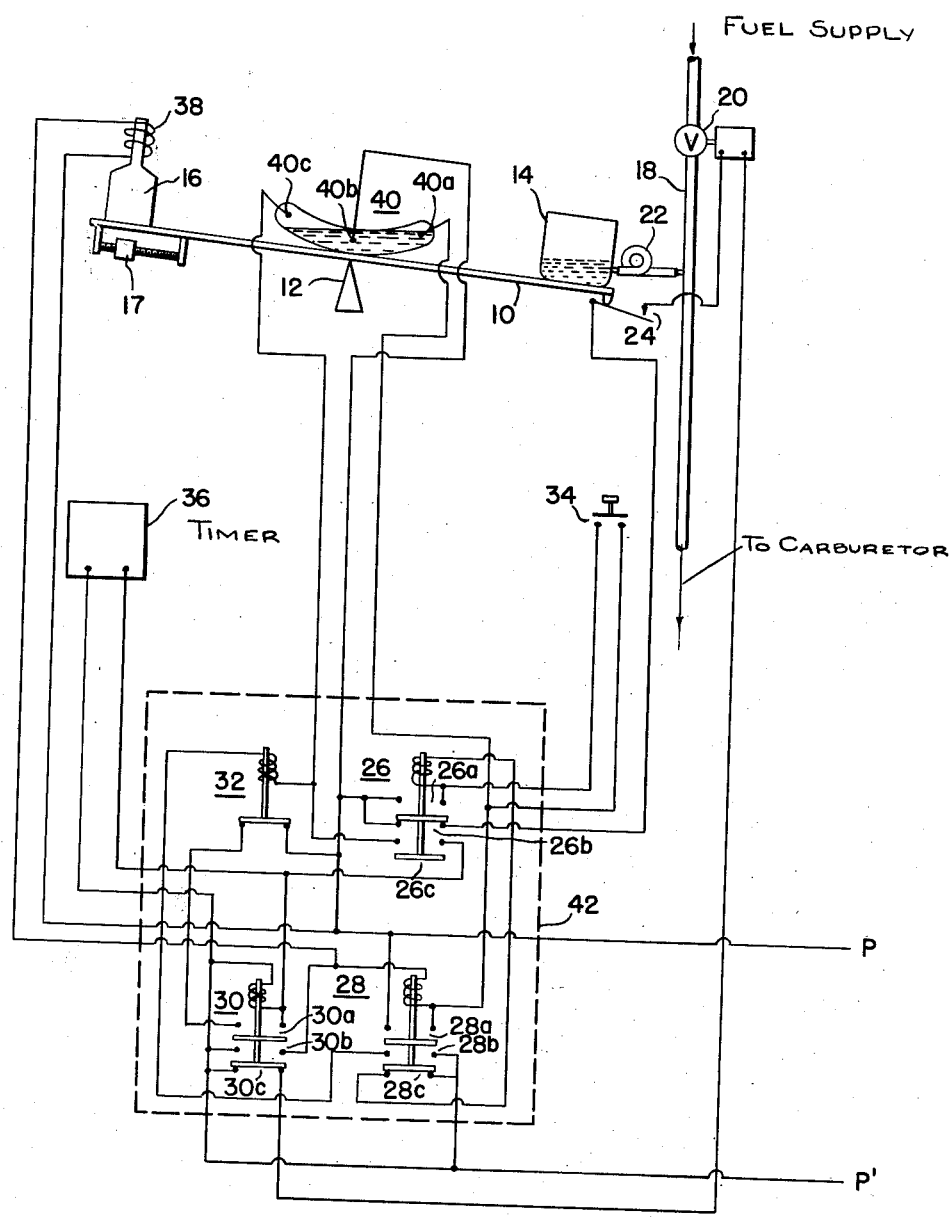

2,672,754

UNITED STATES PATENT OFFICE 2,672,754

FUEL WEIGHING DEVICE

Russell H. Kent, Jr., Springfield, Pa., assignor to Sun Oil Company, Philadelphia, Pa., a corporation of New Jersey Application October 17, 1950, Serial No. 190,531

1 Claim. (Cl. 73—113)

This invention relates, generally, to automatic weighing devices and has reference, in particular, to systems for measuring and controlling the flow of fuel to internal combustion engines for laboratory purposes.

The various experimental tests made on internal combustion engines for measuring fuel consumption involves the careful measurement of fuel quantities and time intervals. The primary difficulty is the coordination of the weighing of fuel during selected intervals of time when the engine is operating. This requires that the operating condition be established before the observed interval be started and continue after the period of observation ceases. Such a measured interval is evidently required to be taken, if it is to be of any technical use, when the engine is warm and operating at its maximum efficiency. It is an object of this invention to provide a control system integrated with the normal fuel supply of an internal combustion engine, which will automatically measure the length of time for the consumption of a predetermined quantity of fuel and return the engine to the normal fuel supply at the end of the measured cycle.

In practicing the invention in a preferred form, a weighing scale supporting a fuel beaker and an electrically controlled weight on the opposite ends of the weighing beam is the basic operating structure. An electric switch mounted on the scale successively connects a plurality of relays into electrical circuits which, in the disclosed arrangement, operates the fuel supply and timing mechanism in proper sequence. The measured cycle is started by a simple push-button operation, and discontinues automatically at the end of the sequence of timed operations returning to normal operation.

For a more complete understanding of the nature and scope of the invention reference is made to the following detailed description, read in connection with the accompanying drawing in which the single figure is a diagrammatic view of the control system embodying the invention in one of its forms.

Referring to the drawing, the reference numeral 10 is a scale or balance beam supported by the fulcrum 12 on which a fuel beaker 14 and an electrically controlled weight 16 rest in balancing position. An adjustable tare weight 17 is permanently attached to balance the beaker 14 and a predetermined minimum level of fuel in the beaker for weighing purposes as will be later described. A fuel line 18 connects a fuel supply not shown to the carburetor of an internal combustion engine, also not shown, the fuel flowing as in the direction of the arrow. An electrically controlled valve 20 is let into the fuel line 18 and permits the fuel to flow through to the engine and also to fill the beaker 14 through the connection 22. An electric switch 24 operated by the beaker end of the scale 10 controls the opening and closing of the valve 20 under normal operating conditions. The scale operated switch 24 and the fuel control valve 20 are electrically connected through solenoid operated relays 26, 28, 30 and 32 to the push-button 34, timing device 36, the solenoid 38 of electrically controlled weight 16 and the scale mounted switch 40 shown here as a conventional mercury switch. The relays are enclosed as indicated in a box 42 and supplied with electrical power through conductors P and P' from a source not shown.

The operation of the described device will best be understood as divided into a normal operating arrangement of continuous fuel supply, and an automatic fuel weighing phase. Under conditions of continuous fuel supply operation the valve 20 is activated to control the fuel supply by the filled beaker 14 weighing the scale downwardly to disengage the switch 24.

A slight upward movement of the beaker end of the scale as fuel is consumed is sufficient to allow contact to be made in switch 24 which opens valve 20. Fuel is permitted to flow through fuel line 18 into the connection 22 and replenish the fuel supply in beaker 14. The scale 10 is tipped downwardly on the beaker side, again breaking contact in switch 24 and allowing valve 20 to close. Thus, movement of the scale in replenishing the consumed fuel under normal operating conditions is very slight and no contacts are made or broken in the scale operated switch 40.

With the relay circuit in the position shown on the drawing the complete electrical circuit for the switch 24 operation of the valve, as affected by the tilting scale for this normal operation, is easily traced from the valve 20 through the switch 24 to relay contacts 26b and to power line P. The circuit is completed to power line P' through relay contact 30c. The position of the scale and relays as shown in the figure permit the continued operation of the device in this phase of operation until the second, or automatic, phase is introduced by the operator pressing the push-button 34 to set up the automatic timed fuel consumption cycle for which the electric relay circuit is designed.

In order to properly establish the sequence of automatic operations for the timing cycle, it is required that the push-button 34 be closed but is effectual only when the beaker end of the scale is depressed and the relay 28 positioned as shown in the figure. With these conditions fulfilled, closure of the button 34 initiates the cycle by energizing the relay 26. The energizing circuit for relay 26 may be traced from power line P through contacts 40a and 40b of the mercury switch 40 and then through the push-button 34 to the solenoid of relay 26, and from power line P' through contact 28c. The energized solenoid lifts the relay which forms its holding circuit through 26a and establishes contact through 26c of relay 26 to mercury switch contacts 40b and 40c not yet joined by the mercury in the switch because the scale is still tilted downwardly on the beaker side. As the contact 26b is broken the valve 20 is no longer controlled by switch 24.

It will be undestood that the internal combustion engine has continued to operate and is using the supply of fuel from the beaker 14 and the supply pipe 18 below the valve which, as the valve 20 is no longer actuated by switch 24, is the sole source of fuel for the continued automatic operation. The full effect of the weights 16 and 17 are such as to outweigh the weight of the fuel in the beaker and tilt the scale downwardly on the weight side. The tilting of the scale under the influence of the weights breaks the mercury contact with 40a and establishes a circuit between 40b and 40c in the switch 40. The scale contact with switch 24 is ineffectual as the scale tilts toward the weighted side and the switch 24 closes, because, contact 26b being broken, the valve 20 remains disconnected. Tracing the newly established circuit with the relay 26 in the raised position as described, the switch contacts 40b and 40c through the contacts 26a and 26c of relay 26 and the electrical clock 36, it will be recognized that the timing of the cycle has started with the energizing of the clock. With the starting of the clock 36, the relay 30 is energized closing contacts 30a and 30b which energizes the solenoid 38 and lifts the electrically controlled weight 16 from the scale. The scale then is tipped downwardly on the beaker side with a determined quantity of fuel therein which exceeds the tare weight 17 by exactly the value of the electrically controlled weight 16.

As has been noted, the fuel control valve 20 has been disconnected by successively breaking the electrical circuit at contact 26b of relay 26, and in the last operation of relay 30, at contact 30c. The energizing of relay 30 closed contact 30a, its holding circuit, and 30b which energized one side of solenoid 28 and closed the weight solenoid 38 circuit causing the electrically controlled weight 16 to be lifted and the balance beam tilted to the fuel beaker side, overcoming tare weight 17, as though additional fuel were poured therein. It will be noted, however, that no additional fuel has been added, the engine still running on the known quantity in the beaker 14 and fuel line 18. This movement of the scale closes the circuit in the mercury switch 40 through contacts 40a and 40b which energizes the other side of the solenoid of relay 28 and closes the relay contacts 28a, the holding circuit, and 28b which prepares relay 32 for the next operation through mercury switch contacts 40b and 40c when the scale tilts under the effect of the tare weight 17 on the consumption of the weighed fuel in beaker 14 by engine operation. The breaking of contact 28c under this action de-energizes relay 26 returning it to the original position shown.

As the amount of fuel weighed by lifting of weight 16 by solenoid 38 is used, the tare weighted side of the scale beam overbalances the beaker side and again shifts the mercury contact of switch 40 to close 40b and 40c, disconnecting 40a. At this time in the cycle, the relays are in such position, as explained above, that this change energizes the relay 32 thus disengaging the clock 36 and releasing relay 30. The release of relay 30 disengages contacts 30a, the holding circuit, and 30b thereby breaking the circuit to the solenoid 38 of weight 16 releasing the weight to the beam scale. The relay 28 is de-energized and opening, re-establishes the normal position of the relays as shown in the drawing with the valve 20 controlled by the switch 24.

In summary there is disclosed an automatic weighing device system for the determination of fuel consumption which may be started from a condition of normal operation and returned automatically to that condition after a sequence of operations controlled solely by the movement of a weighing scale and a connecting electrical relay circuit. The successive automatic operations dependent upon the scale movement are:

A. With the beaker full, the automatic cycle is initiated and the external fuel supply cut off.

B. As the fuel quantity in the beaker is consumed, the weight tilts the scale on the weighted side and establishes contact to start a timing mechanism.

C. As the clock is started, the weight is lifted tilting the scale downwardly on the beaker side with a predetermined quantity of fuel in it.

D. The depletion of fuel in the beaker permits the scale to tilt again on the weight side thus stopping the clock and electrically re-establishing the normal fuel arrangement.

From the above description and drawing, it will be apparent that there has been provided, in a simple and effective manner, a system for controlling the laboratory operations in fuel consumption measurements of internal combustion engines. The human element, which could contribute great error to such operations, has been reduced to the inconsequential act of push-button operation. With the device as disclosed, all functions of the operation are automatic after the push-button start and continue into normal operating procedure without further requirement after the determined operational sequence. Nor, once started, can the cycle be interrupted or interfered with by accidental pushing of the button 34. At any time during the run of an internal combustion engine, the length of time required to consume a measured quantity of fuel, with all other conditions evident from prearranged instrument boards, may be automatically determined.

Since certain changes may be made in the above-described construction and different embodiments of the invention may be made without departing from the spirit and scope thereof, it is intended that all the matter contained in the above description shall be considered as illustrative and not in a limiting sense.

I claim:

A system for measuring the length of time required to consume a predetermined quantity of fuel comprising a balance beam supported on a fulcrum, a receptacle to receive fuel on one end of the beam, a tare weight and an electrically controlled weight in cooperative engagement with the opposite end of the beam, a fuel supply conduit arranged to transmit fuel to and from said receptacle, an electrically controlled valve in said conduit operable to control the flow of fuel to the receptacle, a first switch in operating engagement with the receptacle supporting end of the balance beam electrically connected with said conduit valve to shut off the fuel supply to the receptacle when the beam is depressed by the weight of fuel in the receptacle whereby fuel is permitted to flow solely from the receptacle for consumption, a starter button connected to intiate the operation of the system by electrically disconnecting the control of said first switch to limit the quantity of fuel in the receptacle, a second switch attached to the balance beam at the fulcrum and adapted to move therewith, said second switch including spaced apart contacts on each side of said fulcrum to provide two operating circuits either responsive to the depressed side of the balance beam, a time clock electrically responsive to the circuits established by the second switch as tilted by the balance beam, four electrically connected relays arranged for sequential response to the circuit completion of the second switch moving with the balance beam tilted by the fuel in the receptacle and the effect of the tare and electrically controlled weights; the first of said relays operable to disengage the effect of the first switch to close the fuel conduit valve shutting off the supply of fuel to the receptacle and preparing a circuit between the second switch contacts on the weight side of the balance beam and the second relay; the second relay being energized through the second switch on tilting the balance beam after the fuel in the receptacle has been reduced in amount to equal the value of the electrically controlled weight, further controlling the supply conduit valve by additionally interrupting the first switch to valve circuit, lifting the electrically controlled weight permitting the balance beam to tilt under the influence of the measured quantity of fuel in the receptacle and preparing the circuit from the second switch contacts on the receptacle side of the balance beam to the third relay; the third relay being energized by the tilting movement of the balance beam to the receptacle side, thereby releasing the first relay and preparing the fourth relay to be energized through the contacts of the second switch when the balance beam tilts to the weight side after the measured quantity of fuel in the receptacle is consumed when the fourth relay is closed; the closing of the fourth relay operating to release all relays reestablishing the initial position of the relay circuit and adjusting the system for another automatic cycle in response to operation of the starter button.

RUSSELL H. KENT, Jr.

References Cited in the file of this patent

UNITED STATES PATENTS

| Number | Name | Date |
|---|---|---|
| 1,800,640 | Jehle et al. | Apr. 14, 1931 |
| 1,853,967 | Eggert | Apr. 12, 1932 |
| 2,359,720 | Weckerly | Oct. 3, 1944 |
| 2,571,695 | Ellison | Oct. 16, 1951 |